(12) United States Patent
Scott et al.

(10) Patent No.: US 8,241,726 B2
(45) Date of Patent: *Aug. 14, 2012

(54) IMPACT ABSORBING SAFETY MATTING SYSTEM WITH ELASTOMERIC SUB-SURFACE STRUCTURE

(75) Inventors: Richard P. Scott, Issaquah, WA (US); Bryce L. Betteridge, University Place, WA (US)

(73) Assignee: Satech, Inc., Chehalis, WA (US)

( * ) Notice: Subject to any disclaimer, the term of this patent is extended or adjusted under 35 U.S.C. 154(b) by 90 days.

This patent is subject to a terminal disclaimer.

(21) Appl. No.: 12/543,282

(22) Filed: Aug. 18, 2009

(65) Prior Publication Data

US 2010/0098914 A1  Apr. 22, 2010

Related U.S. Application Data

(62) Division of application No. 11/482,190, filed on Jul. 5, 2006, which is a division of application No. 10/406,473, filed on Apr. 2, 2003, now Pat. No. 7,575,795.

(60) Provisional application No. 60/369,665, filed on Apr. 2, 2002.

(51) Int. Cl.
    *B32B 7/00* (2006.01)

(52) U.S. Cl. .......... 428/120; 428/44; 428/119; 428/218; 428/220; 52/177; 267/153

(58) Field of Classification Search .................. 428/120, 428/44, 119, 218, 220; 52/177; 267/153
See application file for complete search history.

(56) References Cited

U.S. PATENT DOCUMENTS

| | | | | |
|---|---|---|---|---|
| 3,438,312 A * | 4/1969 | Becker et al. | .................. | 404/40 |
| 4,948,116 A * | 8/1990 | Vaux | ................................ | 472/92 |
| 5,234,738 A * | 8/1993 | Wolf | ............................. | 428/120 |
| 5,403,637 A * | 4/1995 | Pickard et al. | .................. | 428/44 |
| 5,618,607 A * | 4/1997 | Togawa et al. | ................ | 428/119 |

* cited by examiner

Primary Examiner — Barbara Gilliam
Assistant Examiner — Zachary Best
(74) Attorney, Agent, or Firm — Patrick M Dwyer

(57) ABSTRACT

A resilient mat system where a mat has overall mat thickness T, and the mat has an upper layer with an upper layer thickness t, and a plurality of supporting resilient substructure columns, each column having a relatively uniform height h, such that $T=t+h$, wherein the ratio of $h:t>3.5$ for values of T>about 0.9 inch (about 2.3 cm). Each column has a frusto-conical column wall, a central void, and a column bottom. The frusto-conical column has its smaller diameter end at the column bottom, a plurality of the columns optionally further have a vertical stiffening rib along a portion of the upper zone of the column wall.

8 Claims, 15 Drawing Sheets

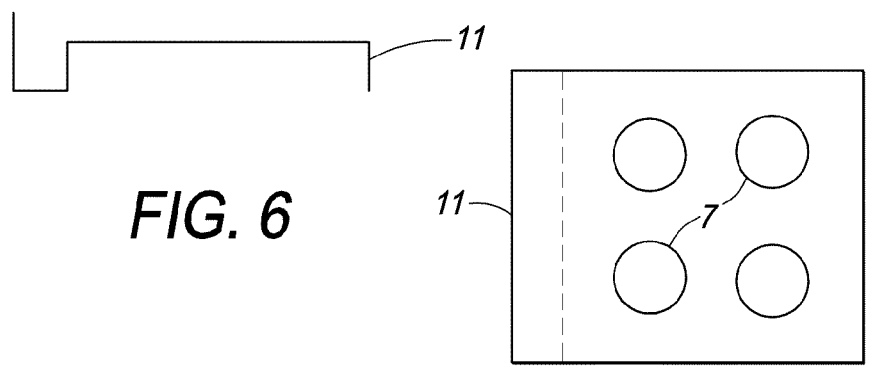
FIG. 6
FIG. 7
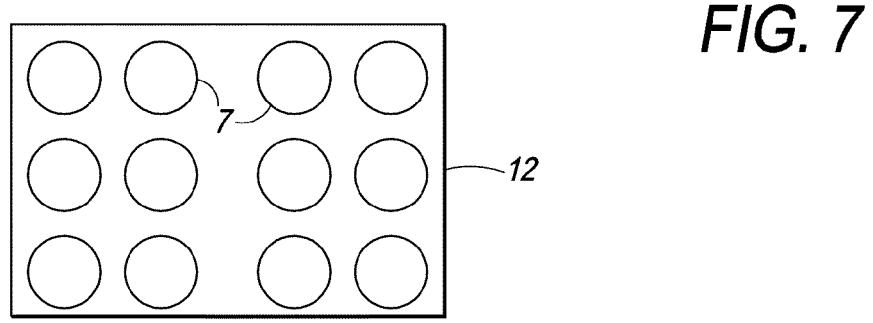
FIG. 8
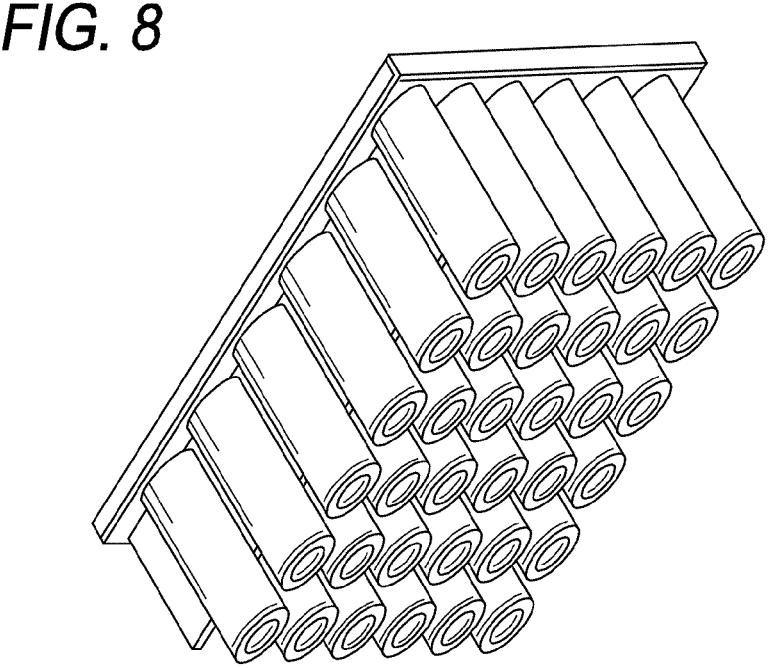
FIG. 9

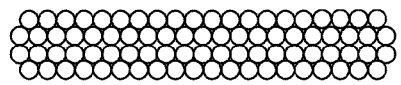
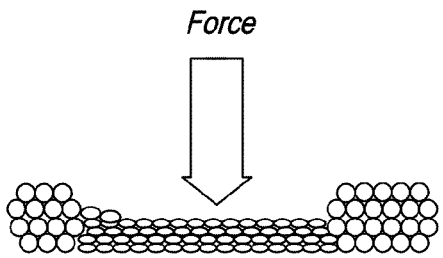
FIG. 16a          FIG. 16b
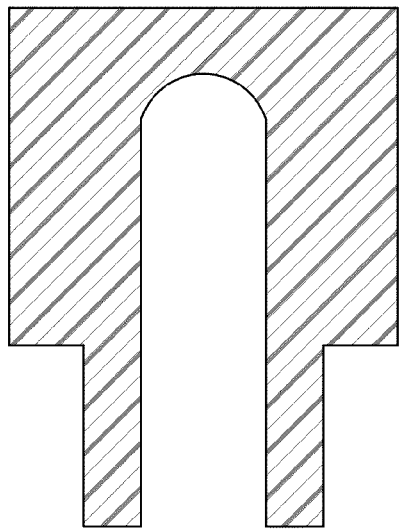
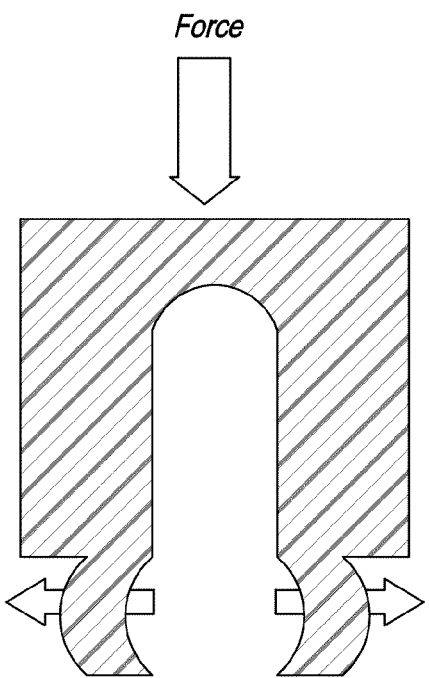
FIG. 17a          FIG. 17b

IMPACT ABSORBING SAFETY MATTING SYSTEM WITH ELASTOMERIC SUB-SURFACE STRUCTURE

This application is a Division of Ser. No. 11/482,190 filed Jul. 5, 2006, now U.S. Pat. No. 7,575,796 which is a Division of Ser. No. 10/406,473 filed Apr. 2, 2003 now U.S. Pat. No. 7,575,795, which claimed priority to U.S. Provisional Patent Application 60/369,665 filed Apr. 2, 2002.

TECHNICAL FIELD

The invention relates to systems for attenuating applied force and absorbing impact energy; more particularly, it relates to safety and antifatigue matting and elastomeric sub-surface structures and deformable structures for attenuating applied force and absorbing impact energy; more particularly it relates to impact absorbing safety matting system with elastomeric subsurface structures and deformable structures for attenuating applied force and absorbing impact energy in healthcare, recreation, industry and home impact surfaces.

BACKGROUND OF THE INVENTION

Conventionally, some kind of matting system is used to relieve standing stress and fatigue or to attenuate falling impact stress. Many such systems are known. Some use closed-cell foam or vulcanized rubber chips bound together to provide a shock absorbing structure. Others use an array of deformable elastomeric cells under an elastomeric surface layer. The problems with most conventional matting systems are twofold. Foam and most other conventional impact attenuating structures actually get harder as the force applied to them increases, and they can bottom out with hip, elbow or head impacts, or even just prolonged standing. In most conventional systems, the force absorbing mechanism begins with an immediate displacement at the very surface of the mat, a displacement that often leads to dangerous foot entrapment and/or other displacement instability for those who play, walk or work on such a surface.

It is generally acknowledged that standing for long periods induces discomfort and fatigue, especially in the lower body. A high proportion (>80%) of industrial workers required to stand for long periods report lower leg or foot discomfort. It is also generally agreed and documented in several scientific studies that standing on a soft surface improves perceptions of comfort and reduces perceptions of fatigue or "tiredness".

The results of research aimed at documenting the physiological basis for antifatigue mats are more equivocal. Standing for long periods often leads to edema (swelling) of the lower legs and feet and antifatigue mats can provide relief. The conventional view is that soft surfaces cause more adjustments to posture, activating the venous pumping that returns blood to the heart, thus reducing swelling and discomfort.

A recent study by Madeleine et al (1998), "Subjective, physiological and biomechanical responses to prolonged manual work performed standing on hard and soft surfaces", *Eur. J. Appl. Physiol.* 77:1-9, however compares responses from people that work while standing for two hours on either hard surface or a soft antifatigue mat. The data reported in this study conflict somewhat with the conventional wisdom.

As to the need for impact safety matting, falls onto hard surfaces are a significant cause of injury and accidental death, especially among the elderly. Among non-fatal injuries due to falling, hip fractures are the most common and the most severe. The loss of mobility following a hip fracture is itself a potentially fatal risk and many elderly patients never return to normal activity after a fall. Given the significant human and medical cost of high hip fracture rates, researchers have explored ways of reducing the rate of hip fractures among the elderly. Proposed strategies include the use of protective hip pads, cushioned flooring and the promotion of exercise programs to increase the strength and agility of at-risk individuals. We review the injury reduction potential of cushioned floors, and calculations as to the effect of compliant flooring materials on the peak impact force acting at the hip.

The fracture strength of the femoral head has been estimated using mechanical tests of cadaveric specimens, finite element modeling and predictions based on material properties. From such studies, the peak lateral loads inducing fractures in older individuals range from 1000 to 6000 N. Younger subjects have greater femoral strength. Fracture strength depends on many factors, including the loading conditions and the age, body size and bone mineral density of the subject.

The force acting at the hip during a fall is affected by a number of factors, most notably the impact velocity, the effective mass involved in the impact, the material properties of the soft tissue overlying the hip and the properties of the surface against which the impact occurs. A group of researchers from Harvard University and Harvard Medical School (Robinovitch et al, 1991) used a constrained release experiment to determine the non-linear stiffness and damping properties of soft tissue and used their results to calculate the impact force on a hard surface. The predicted impact force magnitudes were similar to the breaking strength of the femoral neck, supporting the idea that unprotected falls onto hard surfaces can break the hip. The Harvard hip impact model uses non-linear stiffness and damping functions to describe the viscoelastic properties of the soft tissue overlying the hip and documents the soft tissue parameters for males and female subjects across a range of soft tissue thicknesses.

FIG. 22 is a schematic of the Harvard hip impact model, in which impact of the falling mass m is moderated by the compliant material properties of the soft tissue. Soft tissue behavior is characterized by non-linear stiffness ($k_t$) and damping ($c_t$) functions.

Equation of Motion

The response of the system in FIG. 22 is described by a differential equation in $x_m$:

$$F = m(d^2x_m/dt^2) = c_t(dx_m/dt) = k_t x_m \qquad (1)$$

In order to calculate the peak force of an impact, the model requires parameters for soft tissue properties, the effective mass and a description of the initial conditions (e.g. impact velocity) defining the impact.

Soft Tissue Properties:

Robinovitch (1991), gives non-linear functions for $k_t$ and $c_t$ for both males and females and for different muscle activation states. For the purposes of the analysis presented here, values for male subjects in a muscle-relaxed state were used. Specifically, $$k_t = 90,440(1 - e^{-F/114}) \qquad (2)$$

$$c_t = 756(1 - e^{-F/108}) \qquad (3)$$

Effective Mass:

Robinovitch (1991) reports the average effective mass (m) involved in hip impact to be 39 kg for males in the muscle-relaxed state.

$$m = 39.0 \qquad (4)$$

Initial Conditions:

Van den Kroonenberg et al (1993) report estimated hip-floor impact velocities ranging from 2.14 to 4.25 m s$^{-1}$ and averaging 3.19 m s$^{-1}$.

$dx_m/dt_{(t=0)}=3.19 \text{ ms}^{-1}$ (5)

Also at time t=0:
$x_m=0$
$x_s=0$
$d^2x_m/dt^2=g=9.81 \text{ ms}^{-2}$

Example Solution

Equation 1 is integrated using the properties shown in Equations 2-4 and the initial conditions. FIG. 23 shows the force vs. time curve thus calculated. The peak force of 7022 N at 21.6 ms is similar to the value of 7120 N at 21.6 ms read from the graph in FIG. 6 of Robinovitch (1991). The 1.4% difference in peak force can be attributed to differences in the numerical integration techniques employed, or to errors in measuring peak force values from the graph.

Other conventional mat systems, and especially closed cell foam systems, typically provide dangerous surface deformation levels; this often leads to foot lock or foot entrapment in football games played on surfaces having a foam substructure. Closed cell foam also fails to adequately protect against injuries from serious or 'bottoming-out' impacts.

Conventional systems under football fields tend to compact with time, thus leading to both localized and generalized compaction and hardening of the energy absorption layer under the field. In health care centers and gymnasium-type sports floors, dense rubber has been used in addition to integrated foam pad packing. Dense forms of rubber do not provide bottoming-out protection and are relatively incompressible providing little protection from fall impacts.

Exercise mats made of foam and covered with thin layers of surfacing are easily torn through, thus creating a trip hazard, or they are too soft and can easily entrap the foot. Foam mats also do not provide adequate support activities that involve critical body part (head, hip, elbow and the like) or full body impact with the mat surface and can easily bottom out, allowing potentially injurious impact right through the mat and onto the harder floor surface beneath the mat.

As most conventional mats are compressed, the surface area around the foot is deformed and disturbed and creates a situation where the subject is working, walking or standing on an unstable surface.

Many mats in the market place are also flimsy. They are easily damaged by carts and vehicles that impact the edge of the mat. The replacement frequency is high for mats in these settings. Though the center of the mat is not worn out, the edge is damaged and therefore must be replaced. The mats also easily flip up or bunch up creating trip hazards.

What is needed is a mat system that exhibits little or no surface deformation at working loads, but which is resilient at levels below the surface to attenuate fatigue causing factors, and to safely absorb body impact in the event of falls or other body collisions with impact surfaces.

DISCLOSURE OF THE INVENTION

A impact absorbing safety matting system with a preferably continuous array of elastomeric subsurface structures is disclosed for use beneath a surface layer and beneath artificial turf, poured urethanes, sheet flooring, or other synthetic surface. The elastomeric subsurface structures are preferably geometric in shape, such as for example cylindrical shapes surrounding a void, the void optionally surmounted or topped by a dome. The disclosed impact absorbing safety matting system is advantageously employed for protecting workers, players or residents from accidental fall impacts or sports activity impacts (such as, but not limited to, football or aerobic activities) with an otherwise unprotected ground or floor impact surface. Use of preferred impact absorbing safety matting systems for antifatigue purposes is also disclosed. The array of defined structures described herein is effective at providing worker/resident/player support with a relatively more stable, relatively less deformed, surface layer that does not lead to foot entrapment yet provides effective impact and bottoming-out protection.

Disclosed embodiments may also advantageously serve as a protective system to be installed over a hard surface where falls to the ground are likely. Zones under exercising equipment on school playgrounds, day care centers, and playlands adjacent to fast food restaurants are examples of areas where disclosed safety matting embodiments can be used to minimize injuries that are likely to occur in such play environments. Athletic fields for football, soccer, baseball, and the like are areas where they can be used to minimize injuries that are likely to occur in such sports environments.

Other miscellaneous uses where the disclosed protective surfacing system can be used are physical therapy rooms for the disabled and the elderly, landing zones at the base of firefighter's poles, and operating rooms in veterinary clinics, and the walls of sport courts and patient rooms and the like.

A novel resilient substructure is disclosed. It may advantageously be used as part of a safety matting and antifatigue matting system discussed below, or used independently where substructure attenuation is thought desirable. The substructure includes a resilient column and a column wall, with the wall surrounding a central void in the column. The void opens at a bottom of the column. The column has in a bottom region of the column wall a lower zone that is a more compressible, relatively collapsible zone, and in an upper region of the column wall above the lower zone an upper zone that is a less compressible, relatively uncollapsible zone.

The lower zone is preferably between about 0.4-0.5 and preferably 0.46 inches in height measured from the bottom of the column. The column wall has a cross-sectional thickness that increases from the bottom of the wall to a point where the wall thickness is 120-125% of the thickness of the wall measured at the bottom of the wall, and that point defines an approximate and virtual upper boundary to the lower zone.

A column may optionally have a vertical stiffening rib along a portion of the upper zone of the column wall and the stiffening rib increases in thickness at heights above a rib bottom, with the rib optionally connecting two columns. The column is preferably tapered upwardly, both inside and out, with an outside draft angle >1 degree and <5 degrees, and an inside draft angle >0 degrees and <5 degrees. Preferably, the outside draft angle is greater than the inside draft angle.

The substructure and mat system are comprised of elastomeric material having compression modulus of between 0.5 and 0.9 and a Shore A durometer of 40-50, preferably about 0.69 and about 44 respectively.

A resilient mat system employing the novel substructure is also disclosed. In preferred embodiments it has at least one mat with a mat thickness T, an upper layer with an upper layer thickness t, and a plurality of supporting resilient substructure columns, each column having a relatively uniform height h, such that T=t+h, wherein the ratio of h:t>3.5 for values of T>about 0.9 inch. As above, each column wall surrounds a central void in the column, the void opening at a bottom of the column. The column has in a bottom region of the column wall a lower zone that is a more compressible, relatively collapsible zone, and in an upper region of the column wall above the lower zone an upper zone that is a less compressible, relatively uncollapsible zone.

The resilient mat system optionally has an integral ramp upon at least one edge of the mat, and a set of single ribs may connect a peripheral outer border of columns to a base of the integral ramp. The resilient mat system optionally has a relatively rigid ramp structure bordering at least one mat on at least two sides, and the ramp structure is preferably attached to a floor base to retain the mat, whereby the mat is removable from the border of the ramp. Alternatively, the ramp structure is attached to at least a portion of the mat.

The resilient mat system takes advantage of a unique fenestrated connector, where the connector fenestrations are sized and numbered to receive the bases of a plurality of columns, and the connector has a bend forming a lip that an edge of the ramp fits into for attachment of the ramp to the mat. An alternate fenestrated connector has holes sized and numbered to receive the bases of a plurality of columns from at least two mats such that with column bases of two mats engaged in the respective holes of the connector, the two mats are joined in a selected spaced relationship. One selected spaced relationship is for the two mats to be held to have a selectably sized gap between them, the width of the gap depending upon the spacing of the fenestrations in the connector. An alternate gap holding mechanism is to use a gap spacer in between selected mats at selected locations to establish and maintain a gap, whether or not the fenestrated connector is employed to hold the mats together, such as when the mats are otherwise corralled inside a border of ramp attached to a base floor. This would allow gap setting, while taking full advantage of the ease of removability of such mate inside the ramp corral.

The recognized methodology for testing the shock attenuating properties of playground and athletic surfacing systems is the ASTM F-355 test which uses three different objects at impact velocities appropriate for the intended end-use: first, a cylindrical missile, weighing twenty pounds, and having a circular, flat, metallic, impacting face of twenty square inches; second, a metallic hemisphere weighing fifteen pounds and having an impacting surface with a radius of 3.25 inches; and third, a metallic headform weighing eleven pounds (five kilograms). The report section within the F-355 test methodology lists various ways to collect and analyze data. The two most important measurements of the shock attenuating characteristics of a surfacing system are the G-max and the Severity Index. A G-max of 200 and a Severity Index of 1,000 are internationally recognized as the threshold for a skull concussion for a human being.

Embodiments disclosed herein provide a safety matting system that will not exceed a G-max reading of 200 nor a Severity Index value of 1,000 when tested with any of the three objects listed in the F-355 test methodology over a broad temperature range.

Many preferred embodiments disclosed also provide ASTM F-1292 fall height protection from 1 to 10 feet (using ASTM F-355, hemispherical missile—procedure C) depending on the thickness of the embodiment. Preferred embodiments reduce impact forces from 10% to 60% on the hip, depending on the thickness of the embodiment and on the weight of the subject.

The elastomeric structures disclosed preferably flex more at the base of the sub-structure than at the top of the substructure, thus reducing foot entrapment effects and other surface disturbances around the foot. Preferred structures provide greater protection against bottoming out (also referred to as sudden loss of impact attenuation) by providing a structure with at least two zones of different compressibility. The one zone or lower zone of the structure is defined by the collapsible 'foot' of the cylinder (or other shape of the elastomeric substructure) and the second zone or upper zone is defined by the relatively less compressible upper portion or the substructure shape, or alternatively by the portion of the substructure shape that is contiguous to, or reinforced by, the elastomeric links (also sometimes referred to herein as 'bridges') that preferably link the cylinders to each other.

The array of domed geometric cylinders are preferably covered with a solid sheet of elastomer fenestrated with a corresponding array of drain holes between the cylinders. The cylinders may be beveled or tapered inside so the wall thickness is thicker near the top of the void and thinner at the base of the domed cylinder. The cylinder may be also be shaped in horizontal cross section in any elliptical or many-sided regular or irregular shape (such as for example, but not limited to, hexagon or octagon shaped).

Disclosed structures also isolate and absorb vibrations induced by sources of turning, impacting or bouncing induced vibrations, such as found in the turning of propellers, working engines, other machinery, or the rolling of wheels over non-smooth surfaces.

A preferred elastomeric mat sits in a rigid frame to prevent damage to the mat and therefore increase its useful life. The rigid frame is preferably attached to the floor for greater safety, preventing the mat from flipping over or bunching up in response to a side impact.

Disclosed clips and various conventional methods of damming, taping and gluing can be used to connect a disclosed vertical ramp face to the preferred mat or to the floor or other support surface to create a semi-permanent installation. While the ramps remain attached to the floor surface, the mats within the borders of the ramps can be removed for easy cleaning underneath the mat should this be necessary.

Preferred embodiments provide an elastomeric substructure in a geometric shape that flexes under load or impact and provides a surface condition that reduces both the rate of foot, leg and back fatigue, as well as overall foot, leg and back fatigue, in standing workers. It also provides a surface that absorbs impact energy from a falling hip, reducing impact force measured at the hip by about 10% to about 60% as compared to a 'hard' surface, thus significantly reducing the probability and severity of hip fracture. It also provides a surface that absorbs impact energy from a falling head, preventing concussion level injuries at critical heights below 10 feet. It also provides a surface that feels 'softer' to a standing person as load is applied from the weight of the person, but that essentially immediately returns to its resting shape after the worker moves to a different location on the mat or off of the mat. Preferred elastomeric mats are have a top surface that is supported by multiple flexing elastomeric cylinders that are more readily deformable or compressible, and actually flex more, at the floor surface than at the top surface. This structure provides a more stable work surface.

Embodiments in the form of elastomeric mats preferably have sloped edges or built-in ramps for single mat or 'throw' mat applications, or relatively rigid ramps at the edges of an elastomeric mat array that are significantly harder than the elastomeric matting itself, and that advantageously protect the matting from damage from impacts such as those caused by carts, vehicles or other such devices, and that prevent tripping of workers as they walk up onto or off of the matting. Mats also alternatively have rigid ramps that are removably attached by optionally semi-permanent means to a floor or other sub-base impact surface such as by screw or double-back sticky tape or glue or the like, such that the ramps can be removed if necessary. Preferred ramps may be advantageously colored yellow or otherwise highlighted so the work area draws the attention of the worker as he or she walks up on or off the elastomeric matting.

BRIEF DESCRIPTION OF THE DRAWINGS

FIG. 6 is a side cross-sectional view of the clip of FIG. 7.

FIG. 7 is a top plan view of a fenestrated or holed joining clip.

FIG. 8 is a top plan view of an alternate fenestrated or holed joining clip.

FIG. 9 is a bottom perspective view of a mat.

FIGS. 16 a-b are schematics of a conventional closed cell foam cushion at rest and under load, respectively.

FIGS. 17 a, b are pictures of disclosed embodiments of elastomeric structure, at rest and under load, respectively.

BEST MODE OF CARRYING OUT THE INVENTION

Figure 1:
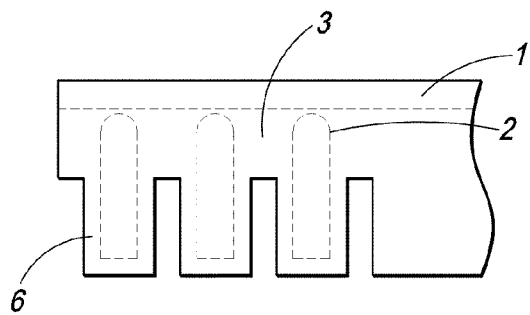
FIG. 1 is a cross-sectional view of one embodiment of elastomeric mat.

Study: Estimated Hip Forces During Falls onto Hard and Compliant Surfaces

The purpose of this study was to estimate the peak force during an impact of the hip on compliant surfaces, in comparison to a nominally "hard" surface. Originally, the analysis was to be based on data from Robinovitch (1991), the Harvard hip impact model discussed in the background section of this application. Robinovitch reports in-vivo measurements of the non-viscoelastic properties of the soft-tissue overlying the hip. However, this model was found to be invalid for all but very low forces, predicting soft tissue compression levels that greatly exceed the thickness of the soft tissue itself.

A new soft tissue model using conservative assumptions of soft tissue thickness and energy absorption capacity is presented. The new model yields much higher peak impact forces than previously reported, but is consistent with measurements of inanimate impacts and with energy conservation laws. Disclosed matting systems were estimated to reduce peak impact force by up to 58%, compared with a nominally rigid surface. Thicker (2 inch or the like) samples had the best shock attenuation performance.

Validity of the Harvard Model

In the course of duplicating the results of the Harvard hip impact model, the validity of the model was brought into question by two important observations.

1. The soft tissue deformations predicted by the model (71 mm) exceed the reported thicknesses of the soft tissue (<50 mm) (Robinovitch does not report soft tissue deformation data)

2. The non-linearity of the soft tissue model described by equations 2 and 3 has little influence on the results of the impact calculation. After about 3 ms, the force has risen to a level where the factor $e^{F/constant}$ is zero and the stiffness and damping coefficients assume a constant, linear value.

These two observations are consistent. The Harvard non-linear soft tissue model is only valid in the low range of force and does not incorporate the increase in soft tissue stiffness that occurs at higher force levels. This stiffness increase must be accounted for since the maximum stated soft tissue stiffness of 90 kN$^{-1}$ is not capable of absorbing typical impact energies without bottoming out. Without accounting for this increased stiffness, the modeled soft tissue remains compliant and appears to undergo deformations that exceed its actual thickness. Linear viscoelastic soft tissue parameters reported by Robinovitch (1997) yield similar results, predicting soft tissue deformations in the 60-70 mm range.

Alternative Soft Tissue Model Formulation

In seeking an alternative soft tissue stiffness model, it is important to bear in mind that the goal of this study is to estimate the shock attenuating effect of surfacing. Any model that assumes stiffer soft tissue will lead to the calculation of higher forces for impacts on hard surfaces, and hence increase the apparent effectiveness of the surfaces. In order to avoid over-estimating the shock attenuation of the surfaces, the following strategy was adopted.

1. Assume that the soft tissue incorporates an efficient non-linear spring

2. Allow the soft tissue to compress by a maximum of 80% of its thickness.

3. Assign to the soft tissue the lowest possible (non-linear) spring stiffness that will absorb the impact energy without bottoming out.

For the purposes of this study, the soft tissue was allowed a maximum compression of 25 mm and assumed to have non-linear force-displacement properties of the form $F=kx^n$, with $n=2$ and $k$ optimized to ensure that the soft tissue alone would absorb the energy of impact at maximum compression. The resulting peak force for an impact on concrete is 24,300N, more than four times the peak force predicted by the Harvard model and well in excess of the force required to fracture the hip. The value is not unreasonable, compared with measured peak forces from real impacts with similar impact energy on compliant surfaces of similar thickness to the soft tissue. This approach essentially maximizes the shock attenuation capacity of the soft tissue within the limits of the available soft tissue thickness. The approach is conservative, tending to underestimate the peak force of an impact on a hard surface and hence underestimating the cushioning effect of compliant surfaces.

Non-Linear Hip Impact Model with Shock Attenuating Surface

Figure 24:
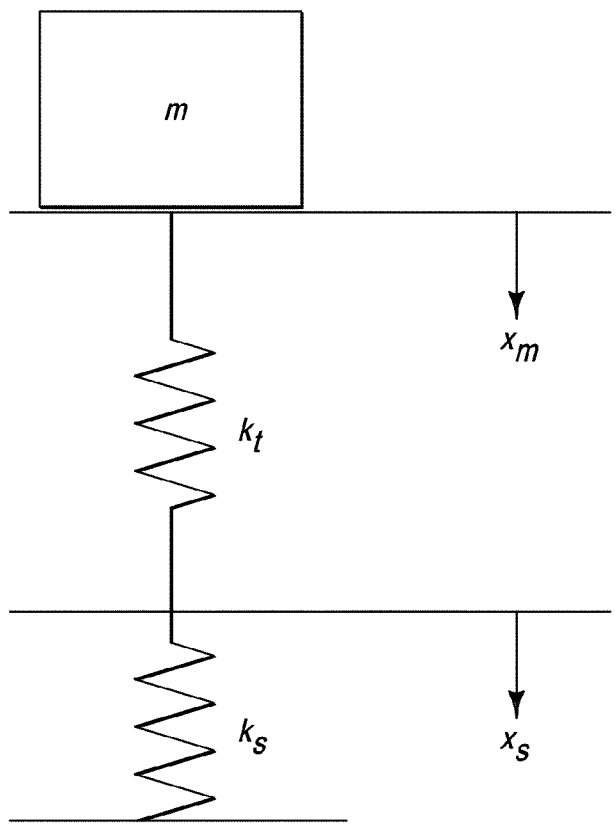
FIG. 24 is a schematic diagram of a new model for Hip Impact.

FIG. 24 shows the new hip impact model with the addition of a non-linear spring representing the elasticity of the surface against which the impact occurs. The impact of the falling mass, m, is moderated by the compliant material properties of the soft tissue and the surface, which act in series. Soft tissue behavior is characterized by the non-linear stiffness function previously described. Damping is ignored. Surface properties are characterized by a non-linear stiffness function of the form $F=Qx^n$, with the constants Q and n determined from material testing of sample surfaces. The two degrees of freedom of motion of the system are expressed as $x_m$, the displacement of the mass, and $x_s$, the compression of the surface.

Equation of Motion

The response of the system in FIG. 24 is described by the following system of differential equations:

$$dF/dx_s = nk_s x_s^{n-1} \quad (6)$$

$$dF/d(x_m - x_s) = 2k_t x_t \quad (7)$$

$$dx_m/dF = dx_t/dF + dx_s/dF \quad (8)$$

Surface Properties:

The stiffness of the surface material is a function not only of its material properties, but also of the geometry of the contact. The surface will behave like a more or less stiff spring, depending on the contact area and the curvature of a body contacting it. The Harvard model does not incorporate contact geometry, and the geometry of contact between the hip and the surface is unknown. For the purposes of this analysis, the contact was assumed to that of a rigid, penetrator with a 0.08 m radius, flat contact area. A selection of embodiments of the disclosed matting systems were mechanically tested on a Tinius Olsen UTM to determine force-displacement relationships and stiffness values. In each case, the force-displacement relationship was expressed in the non-linear form $$F = Qx_s^n \quad (9)$$

Additionally, the surface model was constrained to compress by no more than 80% of it's original thickness, at which point it is assumed to have a high stiffness, approaching that of a very hard surface

TABLE 1

Surface Stiffness Constants

| Sample ID | Thickness mm | Linear Stiffness kN m$^{-1}$ | Non-Linear Stiffness Constants Q | n |
|---|---|---|---|---|
| VALS | 48 | 332 | $3.37 \times 10^6$ | 1.68 |
| 0608 (Rondy) | 48 | 450 | $3.18 \times 10^5$ | 0.91 |
| DEC16s (Rondy) | 17 | 978 | $2.98 \times 10^8$ | 2.22 |
| DEC13s (Intertex) | 17 | 1054 | $2.29 \times 10^{10}$ | 3.21 |
| DEC103s | 26 | 611 | $1.49 \times 10^9$ | 2.93 |
| DEC102s (Rondy) | 26 | 705 | $4.40 \times 10^7$ | 2.00 |
| DEC7s (Valley) | 26 | 611 | $1.74 \times 10^9$ | 2.96 |
| Concrete Floor | | ● | $1 \times 10^{10}$ | 1 |

Results

Table 2 shows the calculated peak force of a hip impact on each of the test surfaces, assuming an impact velocity of 4.25 m s$^{-1}$ and an effective mass of 39 kg. These results are also graphically illustrated in FIGS. 25 and 26a-c.

TABLE 2

| Sample ID | Peak Force kN | Peak Shock g | % |
|---|---|---|---|
| VALS | 11.7 | 31 | 52% |
| 8608 | 10.1 | 26 | 58% |
| DEC 16s | 18.5 | 48 | 24% |
| DEC 13 | 19.7 | 51 | 19% |
| DEC 103s | 17.2 | 45 | 29% |
| DEC 102s | 16.0 | 42 | 34% |
| DEC 7 | 17.3 | 45 | 29% |
| "Hard" Floor | 24.3 | 63 | 0% |

Turning now to the drawings, the invention will be described in a preferred embodiment by reference to the numerals of the drawing figures wherein like numbers indicate like parts.

Figure 2:
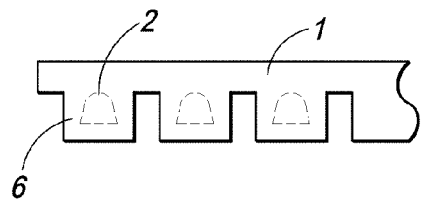
FIG. 2 is a cross-sectional view of an alternate embodiment of elastomeric mat.
Figure 3:
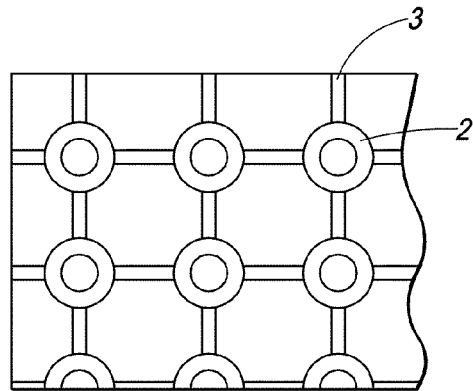
FIG. 3 is a bottom plan view of the mat of FIG. 1.
Figure 4:
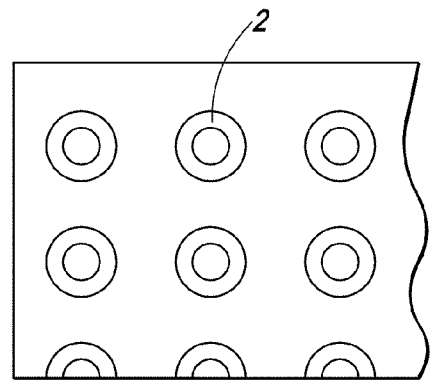
FIG. 4 is a bottom plan view of the mat of FIG. 2.
Figure 5:
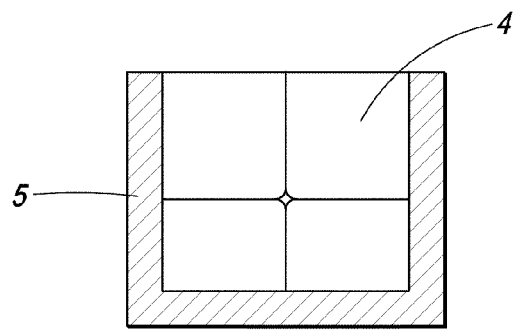
FIG. 5 is a top plan view of a group or array of mats with a rigid ramp attached around three sides of the mat array.

FIG. 1 is a cross-sectional view of one embodiment of elastomeric mat with domed cylinders with sloped or tapered walls and a top surface and elastomeric linkages or bridges. FIG. 2 is a cross-sectional view of an alternate embodiment of elastomeric mat with domed cylinders with sloped walls and top surface, but without elastomeric bridges. FIGS. 3 and 4 are bottom plan views of the mats of FIGS. 1 and 2, respectively. FIG. 5 is a top plan view of a group or array of mats with a rigid ramp attached around three sides of the mat array.

Elastomeric mat 4 has a top surface 1 with underlying subsurface hollow domed cylinders 2. These elastomeric cylinders may or may not be tapered on the inside of the cylinder as can be seen at 2 in FIG. 2 (exaggerated). The material properties of elastomeric cylinders are described with a data plot and accompanying table in FIGS. 14 and 15. Lower zone 6 of cylinder 2 is the zone that first flexes or deforms or collapses as load is gradually applied to top surface 1 of mat 4.

Elastomeric bridges or linkages 3 link cylinders 2 together in some embodiments. Such linkages provide added stability and rigidity to an upper zone of cylinder 2 and render the upper zone relatively incollapsible as load is applied, as compared with the relatively more flexible, compressible, and collapsible lower zone or foot 6 of cylinders 2 which do not have such linkages.

Elastomeric mat 4 is preferably made of conventional rubber and other conventional elastomer molding technology. Mat sizes depend on the size of the mold used, which can vary from small rectangles of perhaps 1 inch square to large rectangles of 100 square feet or more. Mats 4 are abutted together as in FIG. 5 and then can be surrounded by a ramp 5 for ease of walking up on or walking off the mat surface. Sloped edges or integral ramps may also be molded in to the mat and made of the same material as the mat.

Figure 11:
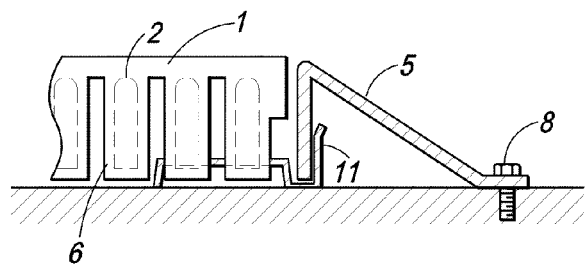
FIG. 11 is a cross-sectional view of a ramp abutted to a mat, with the clip of FIG. 7 joining the ramp and mat.
Figure 13:
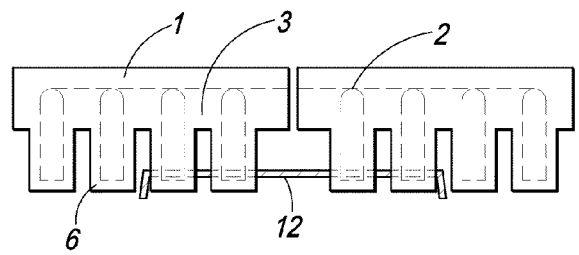
FIG. 13 is a cross-sectional view of the clip of FIG. 8.

FIG. 6 is a side cross-sectional view of the clip of FIG. 7. FIG. 7 is a top plan view of a fenestrated or holed joining clip for use in connecting a ramp piece to a mat. FIG. 8 is a top plan view of an alternate fenestrated or holed joining clip for use in connecting neighboring mats in an array of mats. Grid spacing between rows of holes in the clip cause mats to be joined so as to provide a drainage space between mats for liquids to flow from the top surface down between the mats, or the grid spacing of the holes of the clip can fit the mats tightly next to each other. Clip 12 with holes 7 as seen in FIG. 8 can be used to adjoin neighboring pads as shown in FIG. 13 forming larger surface areas. Clip 11 with holes 7 as seen in FIG. 7 can be used to adjoin ramps to mats or pads 4 as shown in FIG. 11.

FIG. 9 is a bottom perspective view of a mat that has elastomeric bridges between flexing cylinders.

Figure 10:
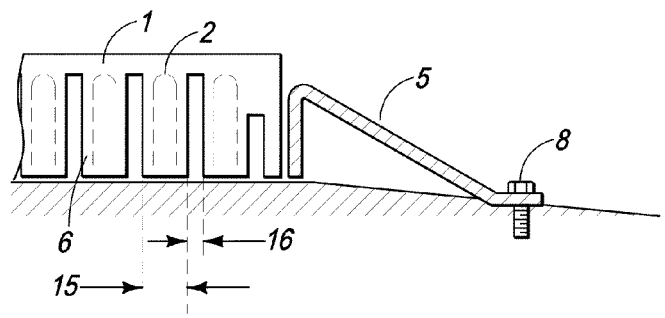
FIG. 10 is a cross-sectional view of a rigid ramp abutted to a mat.

FIG. 10 is a cross-sectional view of a rigid ramp 5 abutted to mat 4. Ramp 5 is attached to the floor surface in preferred embodiments by screws 8, but can also be attached by glue or other suitable means. The mat can be attached to the vertical ramp face by glue or clip (see FIG. 11). FIG. 11 is a cross-sectional view of a ramp abutted to a mat, with the clip of FIG. 7 joining the ramp and mat. In FIG. 10 is also illustrated regions of relatively firmer support 15 and adjacent regions of relatively softer support 16. These correspond respectively to the region 15 just about the supporting column, while region 16 is anything left over that is not above a supporting column. In preferred embodiments with about a ⅝ inch upper column width and columns spaced on ¾ inch centers, the firm zone 15 will be about ⅝ inch in diameter every ¾ inch, and the rest will be region(s) 16.

Figure 12:
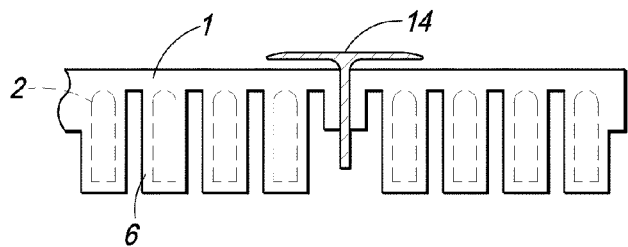
FIG. 12 is a cross-sectional view of a top surface spacer.

FIG. 12 is a cross-sectional view of top surface spacer 14 advantageously used to keep mats spaced in an array a selected distance apart. This structure is advantageously used underneath carpet, artificial turf or other permeable surface coverings to allow drainage of liquids between the mats or pads. Clip 12 as seen in FIG. 13 or top surface spacer 14 as seen in FIG. 12 can be used to set the spacing between mats to allow liquid to pass down between the mats if needed.

FIG. 13 is a cross-sectional view of clip 12 of FIG. 8 joining neighboring mats 4 and providing a selected spacing between them.

A material compression test was run on a Tinius Olsen UTM machine with a compression rate of 1.0 mm s$^{-2}$ to generate the results in Table 3.

TABLE 3

| Test # | Client's Sample ID | Thickness mm | Area cm | Stiffness kN m$^{-1}$ | E = 0.25 Modulus Mpa |
|---|---|---|---|---|---|
| 2094 | sample VALS | 35.4 | 90.3 | 258 | 1.01 |
| 2095 | sample 08608 (Rondy) | 35.4 | 90.3 | 636 | 2.49 |
| 2096 | sample DEC 7s (valley) | 25.0 | 90.3 | 471 | 1.30 |
| 2097 | sample DEC 102s (Rondy) | 25.0 | 90.3 | 668 | 1.85 |
| 2098 | sample DEC 11s (Valley) | 17.5 | 90.3 | 1087 | 2.11 |
| 2099 | sample DEC 16s (Rondy) | 17.5 | 90.3 | 996 | 1.93 |
| 2100 | sample DEC 13s (Intertex) | 17.5 | 90.3 | 1100 | 2.13 |
| 2143 | sample DEC 103s (Valley) | 25.0 | 90.3 | 507 | 1.40 |

Figure 14:
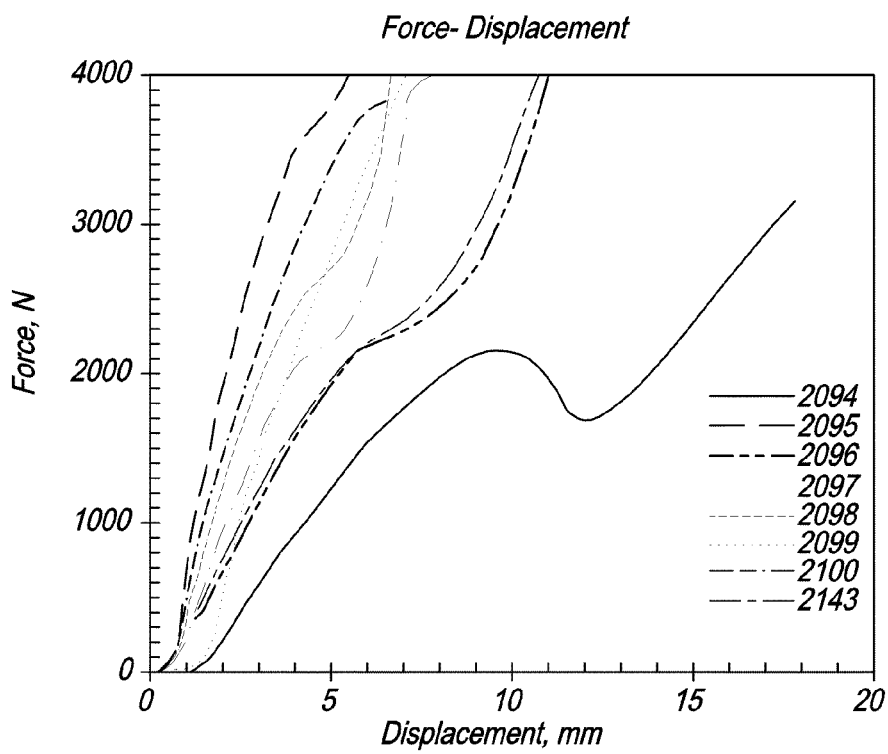
FIG. 14 is a force-displacement curve showing material compression range for 8 different embodiments.

FIG. 14 is a force vs. displacement curve showing material compression range for the 8 different samples from the above table.

Figure 15:
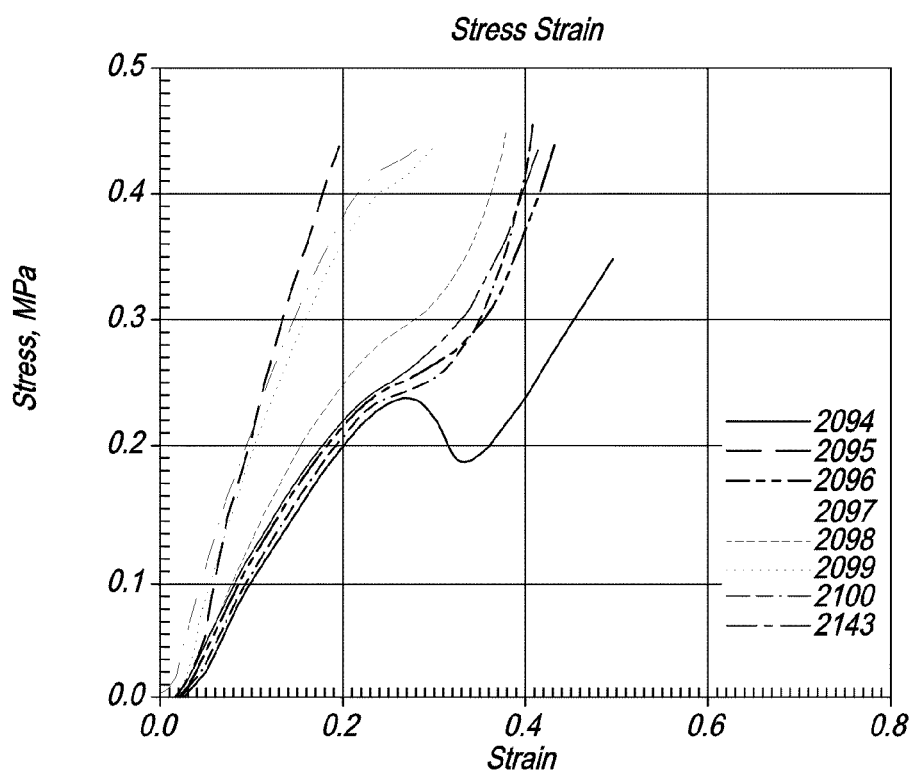
FIG. 15 is a stress-strain curve showing material response to stress for 8 different embodiments.

FIG. 15 is a stress vs. strain curve showing material response to stress for the 8 different samples from the above table.

FIGS. 16 a-b are schematics of a conventional closed cell foam cushion at rest and under load, respectively. In FIG. 16b, the foam cushion shows an unstable condition as the surface deforms under the load, leading potentially to dangerous binding of a foot due to the surface deformation. Impact energy is absorbed by crushing the foam cells from top to bottom, and the material gets just gets 'harder' under load.

FIGS. 17 a, b are pictures of disclosed embodiments of elastomeric structure, at rest and under load, respectively. Note that as the structure takes impact or load, surface deformation is minimal, there is no tendency to bind a foot, impact energy is absorbed by 'controlled' buckling or collapse of the structure (cylinder is illustrated) at a lower zone of the structure, not at the top of the structure. The material thus gets 'softer' under load, as the collapsible structure continues to deform.

Figure 18A:
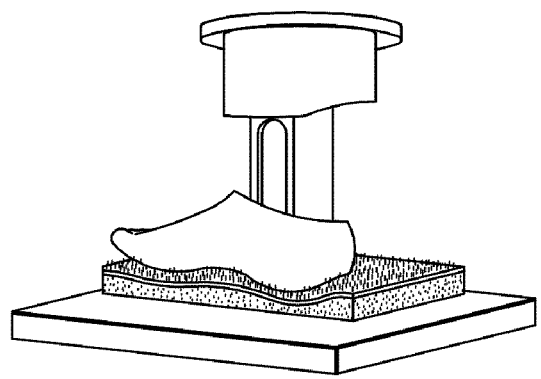
FIGS. 18 a, b are pictures of a foot lock simulation test.
Figure 18B:
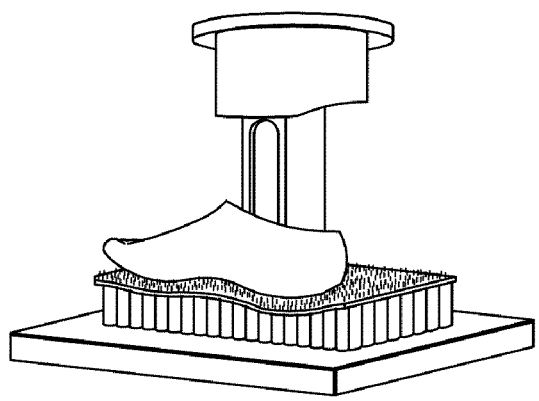

FIGS. 18 a, b are pictures of a foot lock simulation test, showing conventional foam backed artificial turf and one of the disclosed elastomeric structures covered with artificial turf, respectively. In each case the foot is planted with 500 pounds of force. The degree of top surface deformation in the foam (18a) is evident as compared with the minimal deformation in the disclosed structure surface.

Figure 19A:
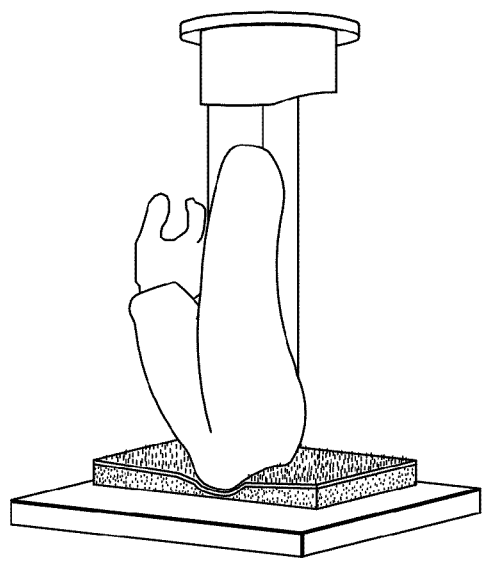
FIGS. 19 a, b are pictures of an elbow penetration simulation test.
Figure 19B:
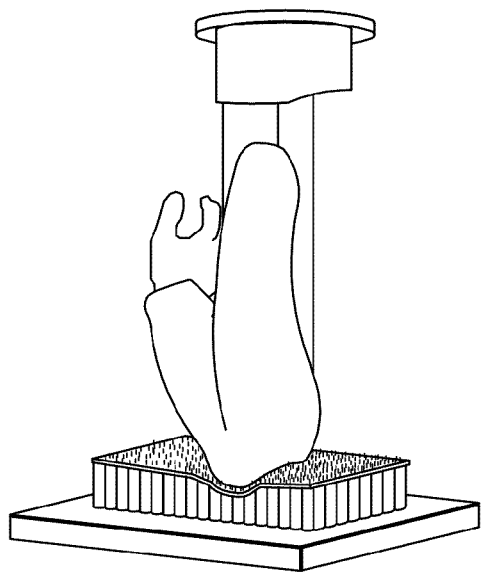

FIGS. 19 a, b are pictures of an elbow penetration simulation test, showing conventional foam backed artificial turf and one of the disclosed elastomeric structures covered with artificial turf, respectively. In each case the elbow is planted with 500 pounds of force. The degree of bottoming out in the foam (19a) is evident as compared with the appreciable penetration with no bottoming out in the disclosed structure surface.

Table 4 contains results of constant velocity force-displacement test to 50% strain at 1 mm s$^{-1}$ on a Tinius Olsen UTM to generate force displacement curves, presented for 9 different embodiments of disclosed structure, including measured elastic modulus and stiffness properties.

TABLE 4

Force-Displacement Properties of Disclosed Embodiments

| Test # | Sample label | Thickness mm | Elastic Modulus MPa | 'Stiffness' Kg cm$^{-2}$mm$^{-1}$ |
|---|---|---|---|---|
| 2069 | Dec 1 | 26.1 | 1.19 | 0.47 |
| 2070 | Dec 5 | 25.9 | 1.05 | 0.41 |
| 2071 | Dec 8 | 25.1 | 0.96 | 0.39 |
| 2072 | VAL | 48.0 | 1.30 | 0.28 |
| 2073 | RON | 47.5 | 1.60 | 0.34 |
| 2074 | ITO 1 | 47.8 | 1.11 | 0.24 |
| 2075 | ITO 2 | 48.0 | 1.11 | 0.24 |
| 2076 | New Mold 2 | 46.4 | 0.92 | 0.20 |
| 2077 | Old Mold | 49.3 | 1.11 | 0.23 |

Figure 20:
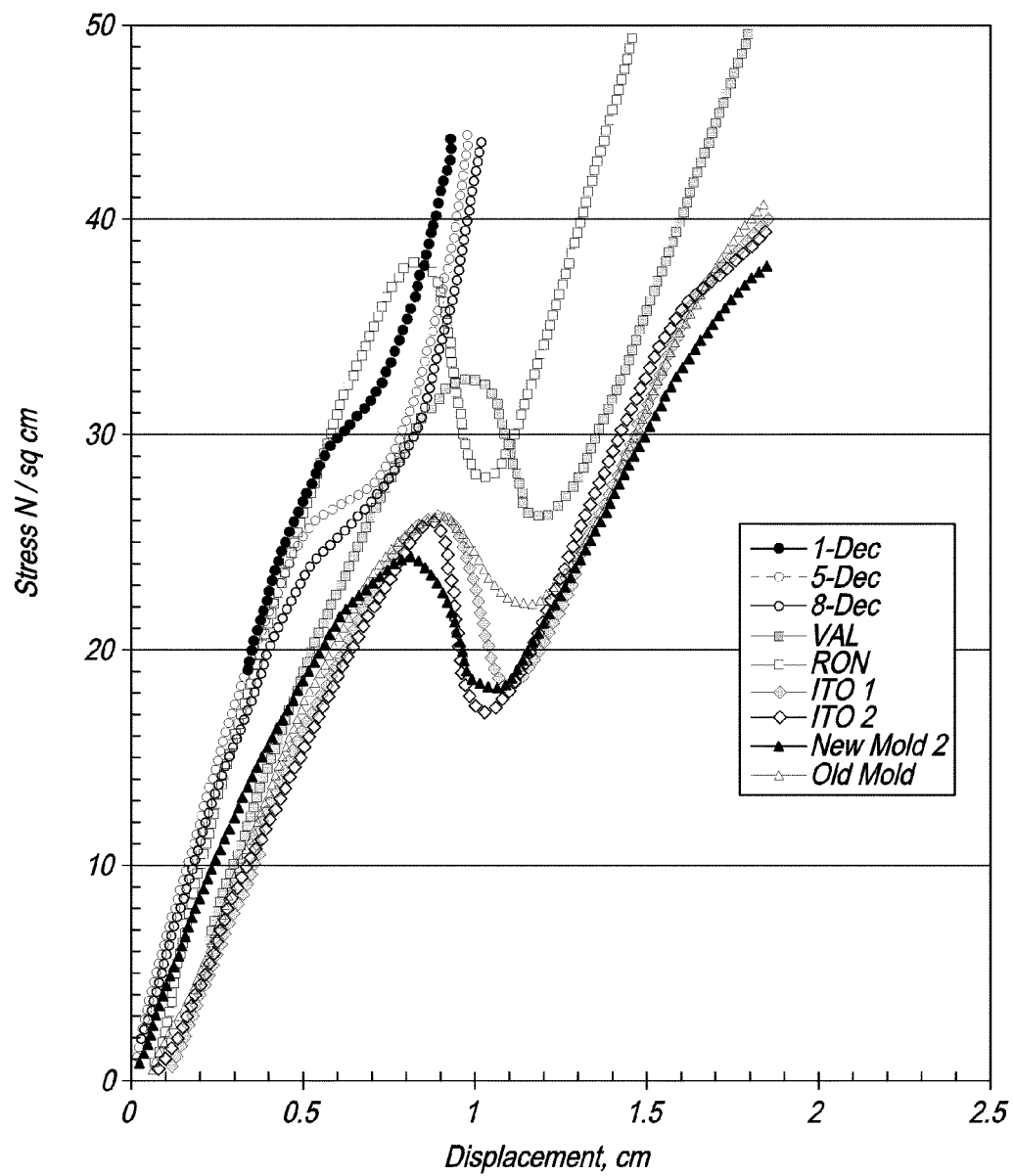
FIG. 20 is a graph of force displacement curves for 9 different embodiments.

FIG. 20 is a graph of force (stress) displacement curves for the 9 different embodiments of disclosed structure shown in the above table. Energy absorption capability is unique as exemplified by shape of the force-displacement curve. The area under each curve is the amount of energy absorbed by that sample.

Table 5 contains drop test data presented for 3 different embodiments of disclosed structure, including Gmax and HIC data for the structures in a 1.75 inch thick Smart Cells® Mat embodiment at 55° F. Data measured according to ASTM F-1292 and F-355 tests.

TABLE 5

| Site: 3, 4, 6 (per F 1936) | Drop | Drop height (feet) | G max | HIC | Critical Height (feet) at HIC = 1000 |
|---|---|---|---|---|---|
| Standard Mat | 1 | 5 | 120 | | |
| | 2 | 5 | 126 | 664 | |
| | 3 | 5 | 125 | 665 | |
| | Average | 5 | 125.5 | 664.5 | |
| | 1 | 6 | 144 | 874 | |
| | 2 | 6 | 141 | 832 | |
| | 3 | 6 | 141 | 859 | |
| | Average | 6 | 141 | 845.5 | |
| | 1 | 7 | 159 | 1021 | |
| | 2 | 7 | 172 | 1200 | |
| | 3 | 7 | 168 | 1164 | |
| | Average | 7 | 170 | 1182 | 6.4 |
| Mat covered | 1 | 5 | 119 | 650 | |

TABLE 5-continued

| Site: 3, 4, 6 (per F 1936) | Drop | Drop height (feet) | G max | HIC | Critical Height (feet) at HIC = 1000 |
|---|---|---|---|---|---|
| with Turf | 2 | 5 | 119 | 658 | |
| | 3 | 5 | 119 | 656 | |
| | Average | 5 | 119 | 657 | |
| | 1 | 6 | 134 | 825 | |
| | 2 | 6 | 136 | 820 | |
| | 3 | 6 | 138 | 852 | |
| | Average | 6 | 137 | 836 | |
| | 1 | 7 | 139 | 939 | |
| | 2 | 7 | 148 | 1031 | |
| | 3 | 7 | 153 | 1091 | |
| | Average | 7 | 150.5 | 1061 | 6.7 |
| Mat with drainage holes | 1 | 5 | 122 | 640 | |
| | 2 | 5 | 118 | 614 | |
| | 3 | 5 | 118 | 613 | |
| | Average | 5 | 118 | 613.5 | |
| | 1 | 6 | 142 | 865 | |
| | 2 | 6 | 144 | 881 | |
| | 3 | 6 | 146 | 898 | |
| | Average | 6 | 145 | 889.5 | |
| | 1 | 7 | 159 | 1000 | |
| | 2 | 7 | 163 | 1101 | |
| | 3 | 7 | 161 | 1121 | |
| | Average | 7 | 162 | 1111 | 6.5 |

Figure 21:
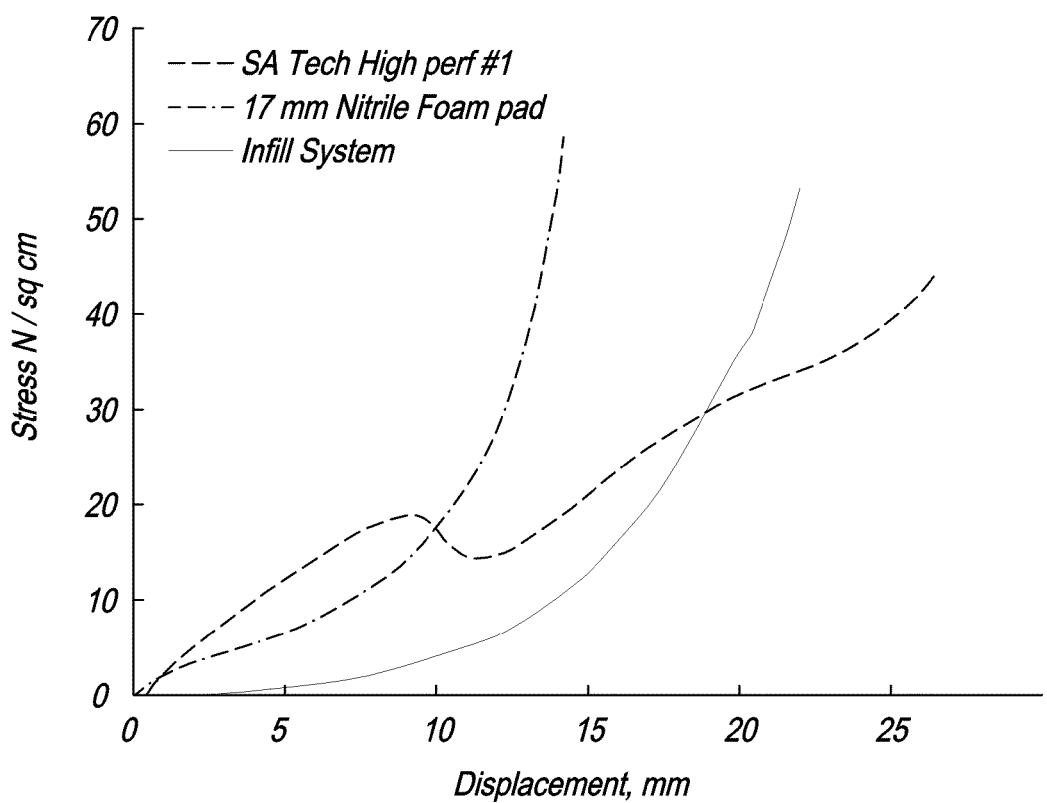
FIG. 21 is a graph of stress displacement curves for the disclosed structure.

FIG. 21 is a graph of stress displacement curves for an embodiment of the disclosed structure as compared to two competitive implementations. For a given displacement the disclosed structure absorbs more energy than competitive products (area under the curve is the greatest for the disclosed sample).

Figure 22:
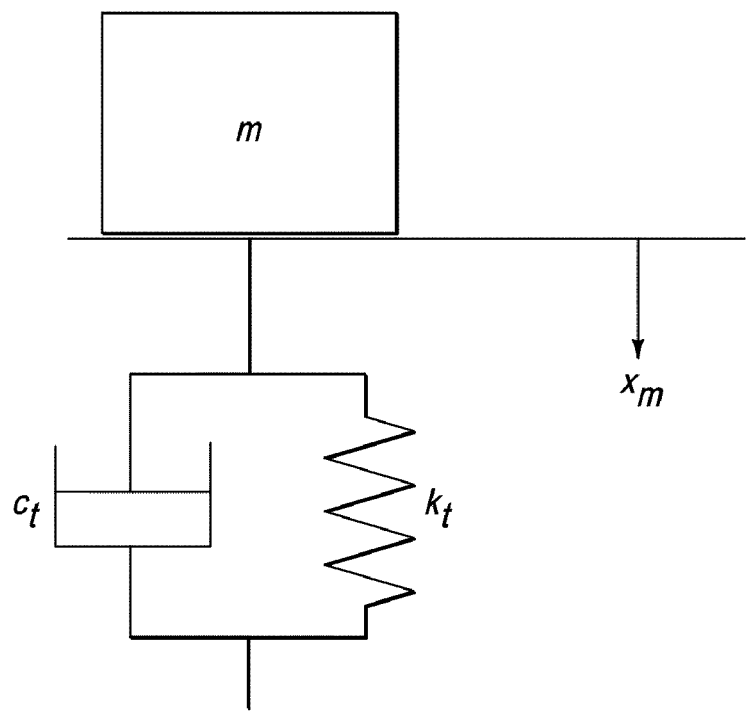
FIG. 22 is a schematic diagram of Harvard hip impact model and supporting equations.
Figure 23:
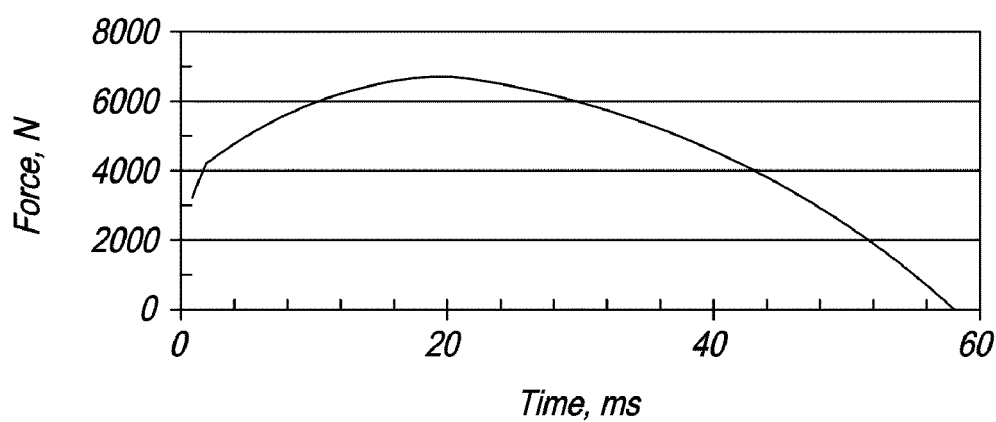
FIG. 23 is a graph of force vs. time for an example solution of a hip impact on a hard surface.

FIG. 22 is a schematic diagram of Harvard hip impact model and supporting equations. FIG. 23 is a graph of force vs. time for an example solution of a hip impact on a hard surface using the Harvard model.

FIG. 24 is a schematic diagram of a new model for Hip Impact using accurate soft tissue component and structure component.

Figure 25:
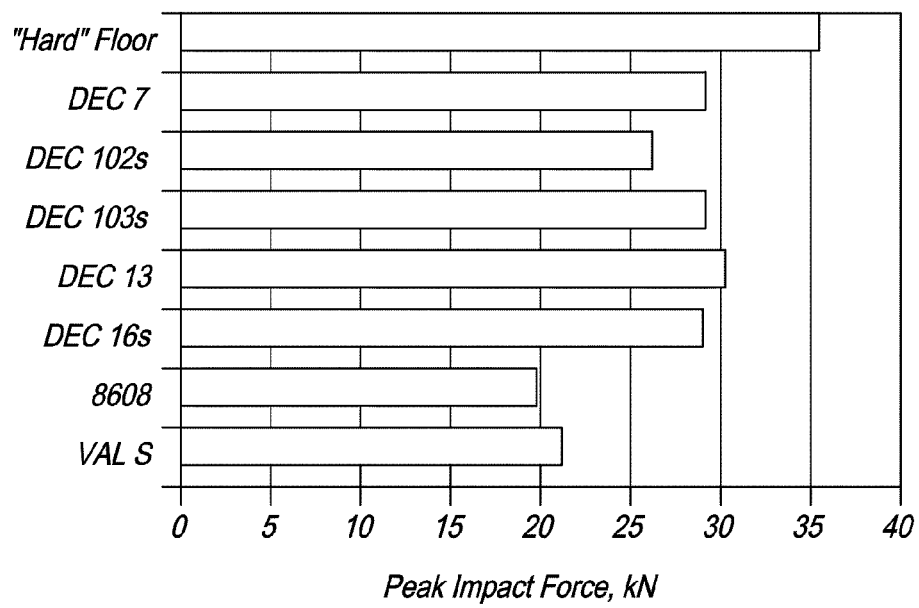
FIG. 25 is a graph of peak impact force comparisons for 7 embodiments of the structure.
Figure 26A:
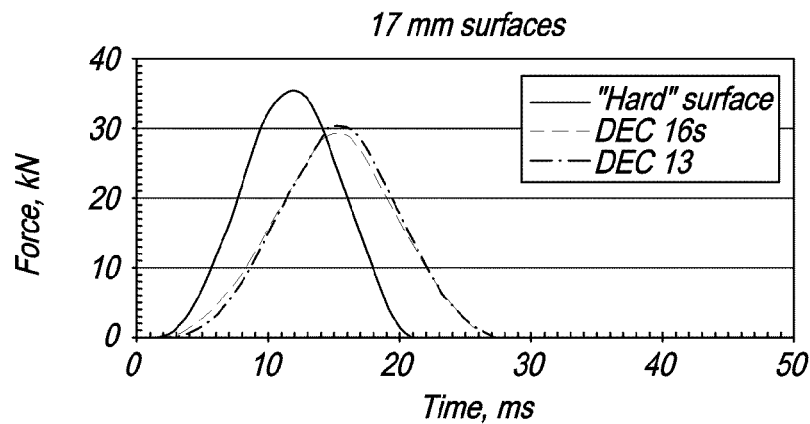
FIG. 26a,b,c are force vs. time curve graphs for hard surface as compared to 17 mm, 26 mm and 48 mm embodiments of the structure.
Figure 26B:
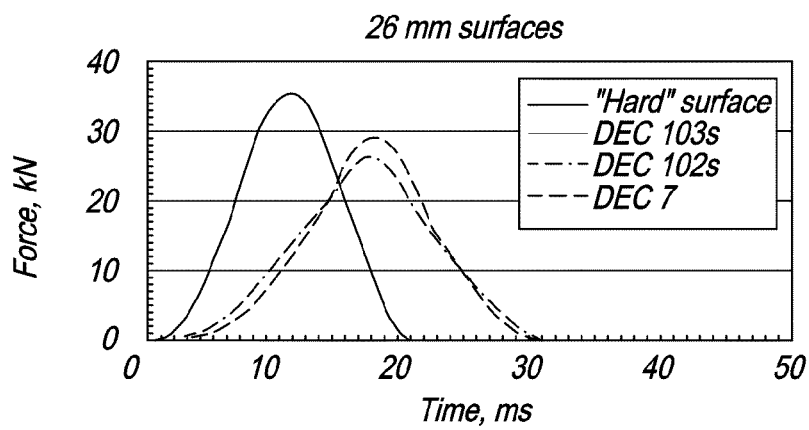
Figure 26C:
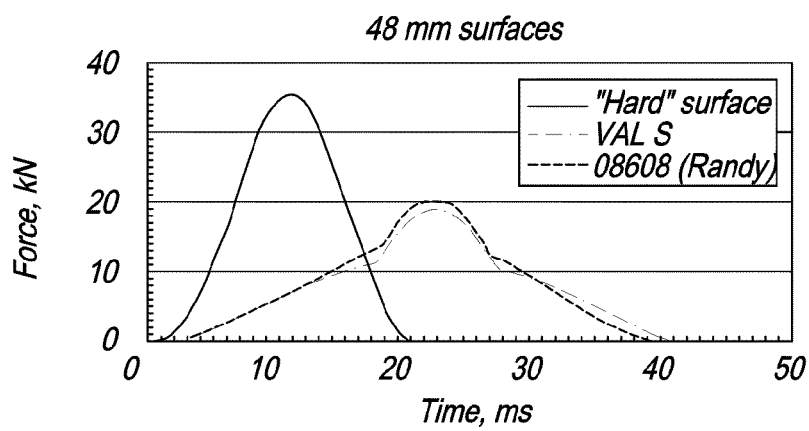
Figure 27A:
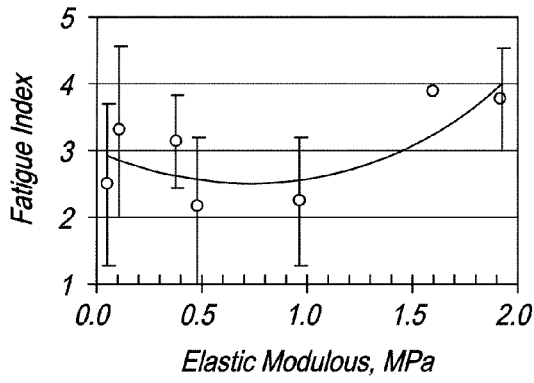
FIG. 27a-d are graphs illustrating an analysis of data.
Figure 27B:
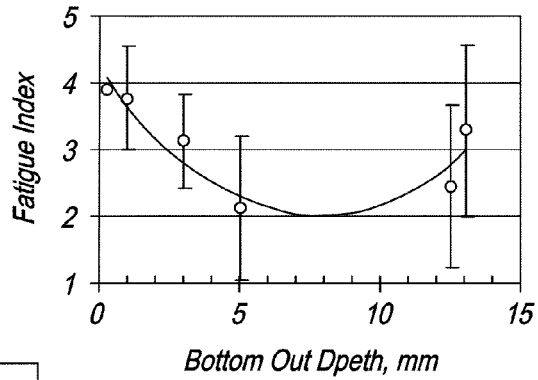
Figure 27C:
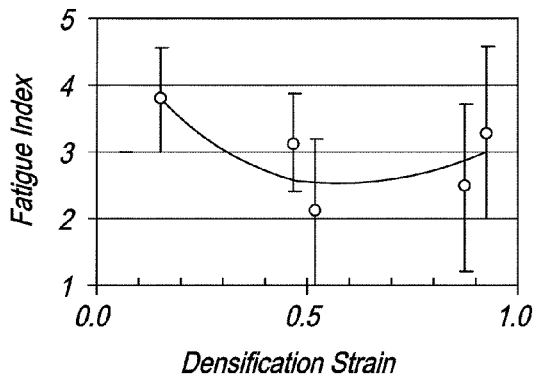
Figure 27D:
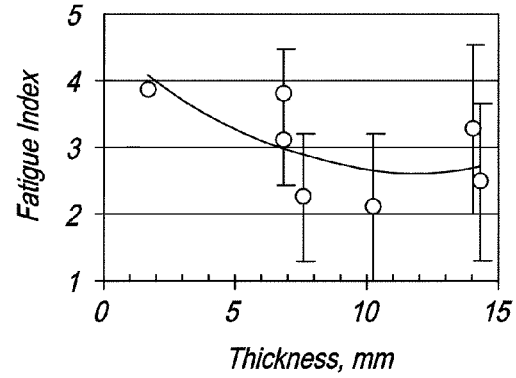

FIG. 25 is a graph of peak impact force comparisons for 7 embodiments of the structure as if a hip were impacting the structure. FIG. 26a,b,c are force vs. time curve graphs for hard surface as compared to 17 mm, 26 mm and 48 mm embodiments of the structure. FIG. 27a-d are graphs illustrating an analysis of data from the literature, showing the effects of different surface materials on perception of fatigue.

Figure 28:
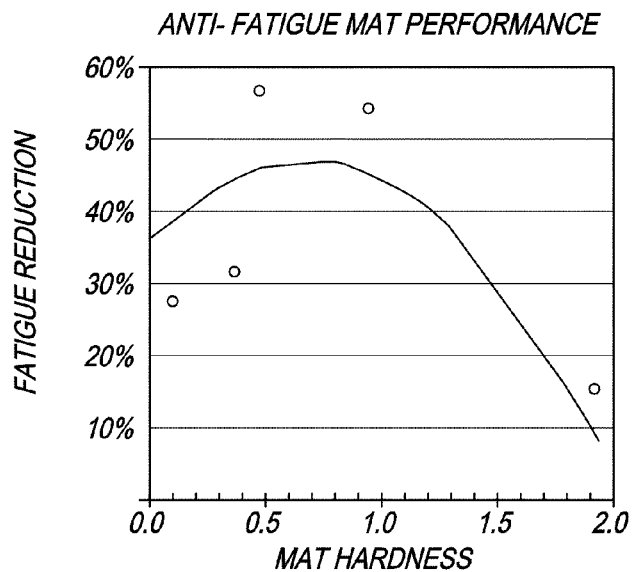
FIG. 28 is a graph illustrating fatigue reduction as a function of mat hardness.

FIG. 28 is a graph illustrating fatigue reduction as a function of mat hardness. The middle vertical bar indicates optimal performance by one of the embodiments disclosed herein, while the vertical bars to the left and right indicate performance by competitor models that are either too hard or too soft.

Figure 29:
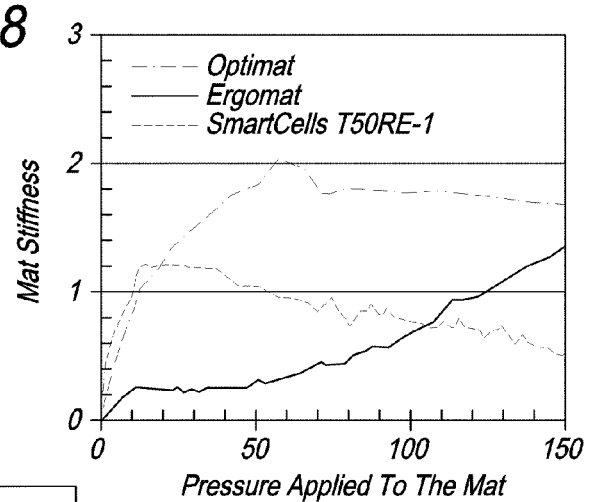
FIG. 29 is a graph of a disclosed embodiment as compared to two competing implementations.
Figure 30:
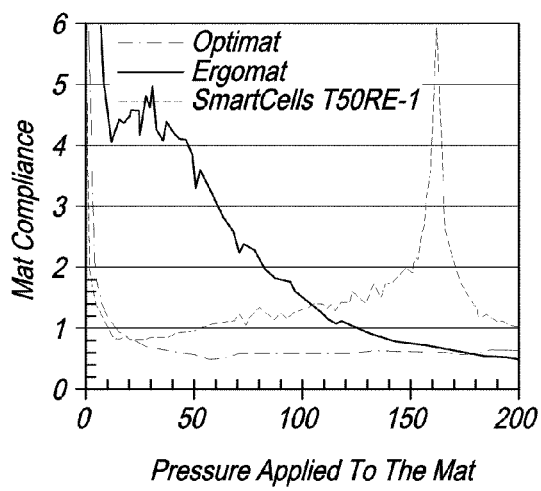
FIG. 30 is a graph of a disclosed embodiment as compared to two competing implementations.

FIG. 29 is a graph of a disclosed embodiment as compared to two competing implementations. Mat stiffness, as a function of pressure applied to the mat, initially increase, over a very small initial pressure range, but then for the disclosed embodiment dramatically falls off as pressure is increased, illustrating the unique property of disclosed embodiments that they actually get softer as pressure is applied. FIG. 30 is a graph of a disclosed embodiment as compared to two competing implementations, plotting mat compliance vs. pressure applied to the mat.

Figure 31:
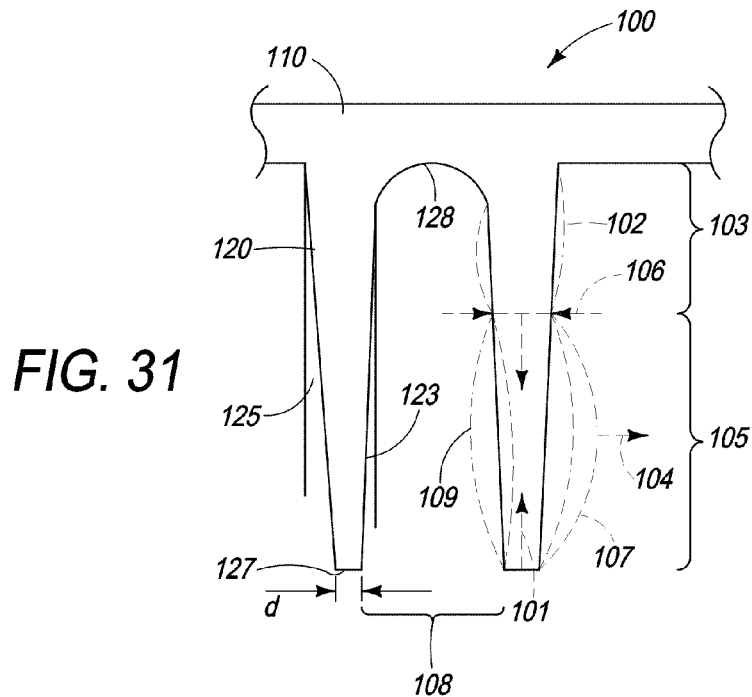
FIG. 31 is a sectional elevation of an embodiment of the disclosed mat.

FIG. 31 is a sectional elevation of an embodiment of disclosed mat 100. Mat 100 has upper layer 110, also sometimes referred to herein as surface layer. Upper layer 110 is supported by column 120. Column 120 may be any ready and appropriate shape, but regular geometric shapes are preferred, and a cylindrical or frusto-conical shape is advantageous in ease of production, and will be discussed here as the model for all such columns. (Except for particular discussion of the draft and other taper angles of column 120 in the frusto-conical column model, for ease of reference, the column will at times typically be referred to as a cylinder.) Column 120 has a column base 127, also referred to herein sometimes as the column foot, or just the foot. It is the part of the column wall that touches the flooring or sub-base structure that underlies the matting system. Column base 127 has a width d. The enclosed void is optionally dome shaped 128 at the top of the void.

The wall of column 120 has two zones, upper zone 103 and lower zone 105; upper zone 103 is relatively resistant to collapse, unlike lower zone 105 which is designed not only to take all of the working load compression, but also the initial over load collapse or deformation, and is relatively much more compressible that upper zone 103. Lower zone typical compression is attended by a moderate deformation shown at paired dotted lines 109 as a slight bulge, both outward and inward, as the compressional forces (arrows 101) work to compress the elastomeric material vertically in height and cause the material to bulge away from the wall's resting boundaries. As the load increases, either due to severely increased load, or due to some impact, lower zone 105 actually buckles or collapses in severe deformation in the manner and in the directions indicated by paired dashed lines 107 and arrow 104. The material ceases essentially to compress or bulge further, and instead collapses outwardly (relative to the center of the column) in the characteristic buckled collapse shown schematically.

Upper zone 103 acts mostly passively throughout both the early and then severe compression and deformation of the lower zone. Depending on forces involved and the dimensions and properties of the rubber and column, upper zone 103 will exhibit only slight bulging, schematically represented by paired dotted lines 102. This difference is designed, and while other, as yet not fully appreciated, factors may be at work, it is believed that the pronounced differential in compression effect and eventual buckling collapse (lower zone 105 only) is due to a significant difference in the geometry of zone 103 compared to zone 105. Zone 105 starts out at the bottom as relatively narrow in cross-section, increasing in thickness until it reaches about 20-25% again as much thickness as it had at the bottom (120-125% of column base width d). Somewhere about in this region, schematically designated by the paired arrows 106 as a virtual zone boundary between upper zone 103 and lower zone 105, the material properties, primarily abetted by increased cross-sectional thickness, simply stop supporting any ready compression or collapse. Above this virtual boundary, compression forces are essentially passed through to the lower zone without bulge or other deformation effect inside the upper zone (until and unless, of course, the lower zone collapses completely, as in a most severe impact on the upper surface of mat 100, at which time the relatively less compressible upper zone 103 nonetheless comes into play to prevent 'bottoming out' by absorbing the extraordinary impact energies remaining after passing through to lower zone 105, and in fact doing some deformation of its own, to good effect in backstopping such severe impacts).

While the schematic illustration of FIG. 31 shows gradual tapering of lower zone 105 up into upper zone 103, crossing only a virtual boundary 106 between the zones, other embodiments will make the boundary explicit by employing increased thickening upwards in other than gradual or tapered fashion. For instance, and not by way of limitation, upper zone 103 could have a sudden thickness change, perhaps even by way of a thickened step at or around boundary 106, so that the increased thickness is suddenly achieved, rather than gradually. Lower step 105 may likewise be 'stepped' but will remain the defined lower zone, it is believed, only while column wall thickness does not exceed about 125% of the base width d.

In a preferred embodiment, column 120 is a hollow truncated cone. The void inside the cone starts at bottom opening 108 and tapers, preferably, up to the point of curvature of the optional dome top 128 of the void. The outside wall of column 120 also preferably tapers upwardly until it joins with the bottom of upper layer 110. The outer wall surface thus has a draft angle • 125, and the inner wall preferably has draft angle • 123. Preferably, angle • 125 will be greater than angle • 123, and angle • will have a value in the range of 1-4.7 degrees, while angle • will have a value in the range of >0-4.5 degrees. For a nominal ½ inch mat (actually about ⅝ inch thick), the preferred draft angles will be about 4.7 degrees for angle • and about 4.1 degrees for angle •. For these dimensions of the ½ inch mat, boundary 106 will be located about 1.5 to 1.85 inches from the column base 127. For a nominal 1 inch mat, the preferred draft angles will be about 2.4 degrees for angle • and about 0.6 degrees for angle •.

Density of columns 120 under upper layer 110 is based on a preferred about 0.6-0.0625 upper conical diameter and columns placed on about ¾ inch centers, so that there will typically be about 256 columns per square foot of matting.

Figure 32:
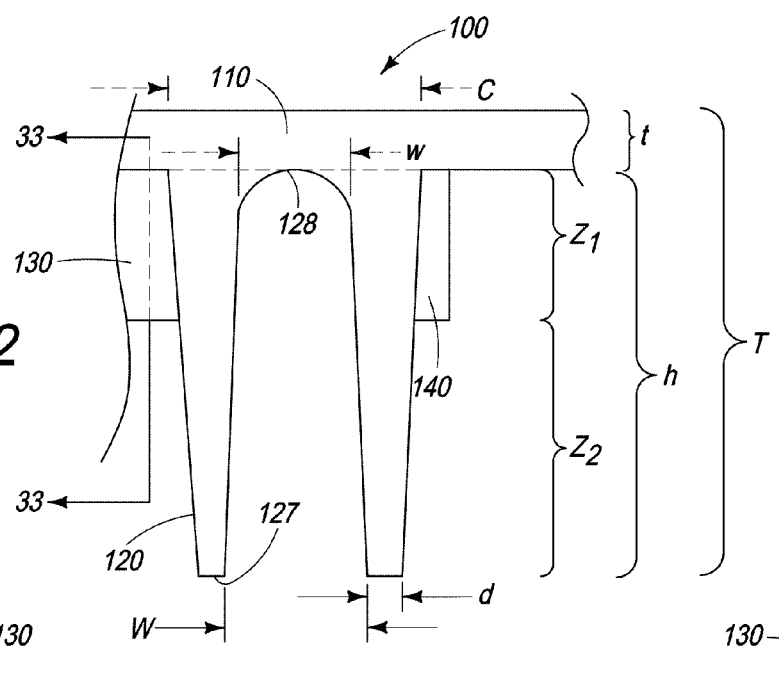
FIG. 32 is a sectional elevation of an alternate embodiment of the disclosed mat.

FIG. 32 is a sectional elevation of an alternate embodiment of disclosed mat 100. Upper zone z1 and lower zone z2 are defined in the same manner as discussed above for FIG. 31. Upper layer 110 has a thickness t and column 120 has a height h; mat 100 has overall thickness T. In general, preferred embodiments will have a ration of h:t>3.5, where preferred thicknesses of upper layer 110 in various embodiments are as follows: 0.18 for ½ inch pad; 0.20-0.25 (preferably 0.22) for the 1 inch pad; and 0.25-0.35 (preferably 0.33) for the 2 inch pad.

Figure 33A:
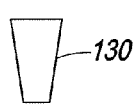
FIGS. 33a,b are sections taken along lines 33-33 of FIG. 32.
Figure 33B:
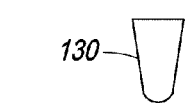

Column 120 has width C at the top of the column, just under the upper layer 110. The void has an uppermost width w, just before any dome 128. In this alternate embodiment, preferred for 1 inch mats and thicker, column 120 has a stiffening rib 140 and/or a linkage or bridge 130 (connecting to other columns and to the underside of upper layer 110). In either case, the effect of the rib 140 or link 130 is to make the upper zone or z1 that much stiffer and so enhance the effects discussed for FIG. 31 for upper zone 103 or z2 here. At least one effect is that, to the extent a rib 140 or link 130 is joined to column 120, the column width at that point is significantly and effectively greater than below the rib or link, or elsewhere around the column. Rib or link optionally have a taper as shown in FIG. 33a, b which is a section taken along lines 33-33 of FIG. 32; the taper may optionally end in a rounded rib bottom or a flat bottom. Column base 127 has a width d, and void opening 108 has a width W, where, for cylindrical or conical column enclosing a cylindrical or conical void, the area A of the column base is given by the formula, $A = \bullet\{((W+2d)/2)^2 - W^2\}$.

Optimal Antifatigue Mat Properties

Redfern (1995), "Influence of Flooring on Standing Fatigue", *Human factors* 37(3) 570-581, studied the effects of floor material properties on workers' perceptions of fatigue, tiredness and comfort. Harder surfaces increased perceptions of discomfort. Softer, thicker materials reduced perceptions of tiredness but, notably, an extremely soft flooring surface increased perceived tiredness. These results suggest that there are optimal antifatigue mat properties, neither too hard nor too soft, that will offer the best performance.

The graphs of FIGS. 27a-d present an analysis of Redfern's data, showing the effects of different surface materials on perception of fatigue. The "fatigue index" is the average of "tiredness" and "Leg Tiredness" ratings reported by Redfern. In each case, a quadratic curve fitted to the data using a least squares method shows a "minimum", i.e. a value of the material property that would appear to minimize the perception of fatigue.

Table 6 below lists the values of antifatigue mat properties that are thus predicted to produce the most favorable perception outcomes.

TABLE 6

| Property | Value |
| --- | --- |
| Elastic Modulus | ~0.7 MPa |
| Bottom Out Depth | >5 mm |
| Densification Strain | >0.6 |
| Thickness | >10 mm |

From these data it may be inferred that

1. The appropriate "hardness" of an antifatigue mat is that produced by a material with an elastic modulus in the range 0.5-0.9 MPa. Redfern's data suggests an optimum value of 0.69 MPa.

2. Given an appropriate hardness, the antifatigue mat must allow enough compression to accommodate normal loading conditions without bottoming out. The optimal modulus range implies mat compression of up to 50% during normal standing and stepping, so the densification strain (bottoming out point as a percentage of thickness) must exceed 50%.

3. Redfern's data suggest that mats with a bottoming out depth greater than 5 mm and a thickness greater than 10 mm produce the best results, unless they are too soft.

It now appears that standing for long periods on hard surfaces is perceptually and subjectively uncomfortable and leads to fatigue. A properly designed antifatigue mat increases comfort and reduces tiredness and swelling of the feet and legs.

Antifatigue mats appear to work by reducing pressure and encouraging the body to make small postural adjustments while standing. The small movements share the work of balancing among different parts of the leg muscles, so individual muscle fibers do less work and fatigue less rapidly. The postural adjustments also assist the body's "venous pump". More blood circulates back to the heart instead of pooling in the legs and feet, causing swelling.

Research shows the performance of an antifatigue mat depends on it's hardness and thickness. Mats that are too hard or too soft are not as effective in reducing fatigue as a mat. Disclosed embodiment mats are engineered for maximum fatigue reduction. See FIG. 28.

A mat that is too hard feels less comfortable. The mat does not attenuate impact or reduce pressure on the foot as well, and does not allow the small postural adjustments that appear to reduce fatigue and improve circulation in the foot and leg, and may also focus loads on a few small muscle regions, accelerating fatigue.

A mat that is too soft 'bottoms out' when you stand on it and works just like a mat that is too hard. It is less able to reduce shock when the foot lands on the mat, and it may be unstable, increasing fatigue as the body works unconsciously to maintain balance.

Disclosed mats are tuned to the ideal level of compliance that research shows maximizes antifatigue performance.

Optimized performance ensures stability and support while reducing pressure on the feet, reducing leg shock and maximizing fatigue reduction. The disclosed structures create a regular pattern of very slightly firmer zones about 0.6 inches across and approximately ¾ inch O.C. surrounded by very slightly softer zones. One early study of compliant flooring found that such small variations in the properties of a surface mat encourage small movements of the ankle and encourage blood flow, reducing fatigue and discomfort. Conventional compliant flooring materials compact and get hard when they are compressed. A foam mat that feels soft to the touch gets harder when you walk on it; harder even than some rubber mats. The unique structures disclosed herein are actually firm to the touch, but then get softer as applied pressure is increased. See FIGS. 29 and 30.

The operation of a system of mats or a single mat is straightforward once the work area has been defined where the mat(s) are to be installed. A ramp is placed where needed, if needed, and then mats are installed within the defined ramp border or even within the room borders, if mats are to go right up to the wall (see FIG. 5). The worker easily walks up onto the surface using the ramp and off the surface using the ramp. As the worker works on the surface 1 (see FIGS. 1-5) the cylinders flex at their lower zones 6 and support the worker, protecting him/her from the hard floor surface.

Preferred mats are made of an SBR/EPDM/natural rubber elastomeric material with the following properties: Shore A Durometer of 40 to 70 (more particularly 40-50 and most preferably about 44) measured on the surface of the mat; material compression measurements made using a 90 cm$^2$ sample and a 1 mm s$^{-2}$ compression rate as follows: stiffness of from about 100 kN per meter to about 2000 kN per meter; and modulus of from about 0.5 MPa to about 4 MPa, and more particularly at about 0.69 Mpa. Compressive modulus is believed to be optimized by controlling the product of the 300% elongation modulus figure and the Shore A durometer value. Antifatigue properties are believed to be optimized in the range of 200-400 psi for 300% elongation modulus value. One antifatigue embodiment has the following values: % elongation=297; tensile=882; tear=186; durometer=58; Bayshore=36%. Yet another has: % elongation=396; tensile=698; tear=73; durometer=53; Bayshore=42%.

Preferred elastomeric mats are made in thicknesses between ½ inch to 3 inches, and have a top, upper or surface layer across the elastomeric substructure array. This surface layer may advantageously be either a smooth or a rough surface and be either perforated or non-perforated. The preferred surface layer has a thickness of from about 0.16 to 0.30 inches and more preferably 0.18, 0.20-0.25 and 0.25-0.28 inches respectively for mats nominally sized at ½ inch, 1 inch and 2 inches. Other surface layer thicknesses may advantageously be employed in unusual situations.

Mats can be joined and then covered with conventional industrial floor coatings, or with artificial turf, carpet, vinyl, rolled rubber or poured urethane. Mats can be of any conveniently manufactured size and, by abutting and joining multiple manufactured sizes, can cover an infinitely large surface area. Mats are preferably prevented from moving by providing a ramp or other type of dam or wall around the mats, or by adjoining neighboring mats with a joining clip or clips as described herein, or by gluing or taping the mats to the floor surface, or to each other.

A preferred elastomeric substructure is a cylinder surrounding a void that tapers upwardly from a void opening of about 0.36 inches to about 0.31 inches and then is preferably domed above the taper. The preferred cylinder wall thickness is about 0.10 inches and the cylinder is preferably about 0.56 inches wide at its foot or base (the end of the cylinder that touches the floor or base surface), and tapers upwardly to a diameter of about 0.6 inches.

Preferred substructures can be on a uniform grid or in a honey-combed configuration. Preferred substructures can be of circular, elliptical, or multi-sided shape from three sided to 20 sided or more. Preferred substructures can have a shared wall configuration without elastomeric bridge linkage between the cylinders on the one hand, or can alternatively be joined to one another by elastomeric linkages varying in length of from several hundredths of an inch long to about 2 inches, but preferably about ⅛ inch, and have width of from several hundredths of an inch to about ½ an inch, but preferably about ⅛ inch.

With regard to systems and components above referred to, but not otherwise specified or described in detail herein, the workings and specifications of such systems and components and the manner in which they may be made or assembled or used, both cooperatively with each other and with the other elements disclosed herein to effect the purposes herein disclosed, are all believed to be well within the knowledge of those skilled in the art. No concerted attempt to repeat here what is generally known to the artisan has therefore been made.

INDUSTRIAL APPLICABILITY

Standing for long periods on hard surfaces is perceptually and subjectively uncomfortable and leads to fatigue. A properly designed antifatigue mat increases comfort and reduces tiredness and swelling of the feet and legs. Disclosed mats are tuned to the ideal level of compliance that research shows maximizes antifatigue performance. Optimized performance ensures stability and support while reducing pressure on the feet, reducing leg shock and maximizing fatigue reduction. Conventional compliant flooring materials compact and get hard when they are compressed. The unique structures disclosed herein are actually firm to the touch, but then get softer as applied pressure is increased. Working people who must stand at their jobs are more productive when less fatigued and have less back, foot and leg pain. This generally lead to fewer accidents.

In compliance with the statute, the invention has been described in language more or less specific as to structural features. It is to be understood, however, that the invention is not limited to the specific features shown, since the means and construction shown comprise preferred forms of putting the invention into effect. The invention is, therefore, claimed in any of its forms or modifications within the legitimate and valid scope of the appended claims, appropriately interpreted in accordance with the doctrine of equivalents.

We claim:

1. A resilient mat system comprising at least one mat, the mat having a mat thickness T, the mat having an upper layer with an upper layer thickness t, the mat further comprising a plurality of supporting resilient substructure columns, each column having a relatively uniform height h, such that T=t+h, wherein the ratio of h:t>3.5 for values of T>about 0.9 inch (about 2.3 cm), each column having a column wall, the column wall surrounding a central void from the top of the void to the bottom of the column, wherein the column wall has a cross-sectional thickness that increases from the bottom of the wall to the top of the void to form a frusto-conically shaped column, and wherein the column is tapered upwardly, both inside and out, with an outside draft angle >1 degree and <5 degrees, and an inside draft angle >0 degrees and <5 degrees and the outside draft angle is greater than the inside draft angle.

2. The resilient mat system of claim 1 further comprising an integral ramp upon at least one edge of the mat.

3. The resilient mat system of claim 2 further comprising a set of single ribs connecting a peripheral outer border of columns to a base of the integral ramp.

4. The resilient mat system of claim 1 further comprising a vertical stiffening rib along a portion of the upper zone of the column wall.

5. A resilient mat system comprising at least one mat, the mat further comprising a plurality of supporting resilient substructure frusto-conical columns, each column having a column wall, a central void, and a column bottom, with each frusto-conical column having its smaller diameter end at the column bottom, and wherein the column has an outside draft angle >1 degree and <5 degrees, and an inside draft angle >0 degrees and <5 degrees and the outside draft angle is greater than the inside draft angle.

6. The mat system of claim 5 further comprising a vertical stiffening rib connecting an upper zone of two columns.

7. The mat system of claim 6, wherein the stiffening rib increases in thickness at heights above a rib bottom.

8. The mat system of claim 5 wherein a plurality of the columns further comprise a vertical stiffening rib along a portion of the upper zone of the column wall.

* * * * *